Dec. 12, 1967 W. B. HANSEL 3,357,797
WAVE ENGINE PORTING MEANS
Filed Oct. 20, 1964 2 Sheets-Sheet 1
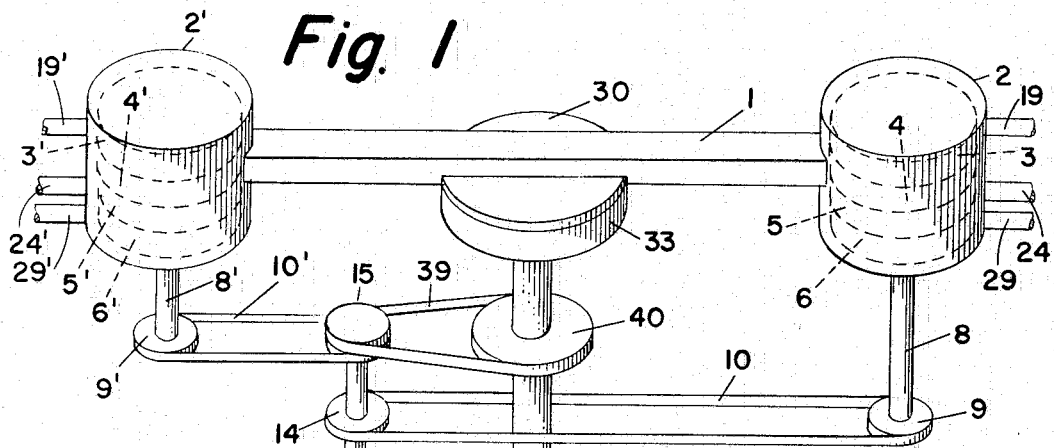
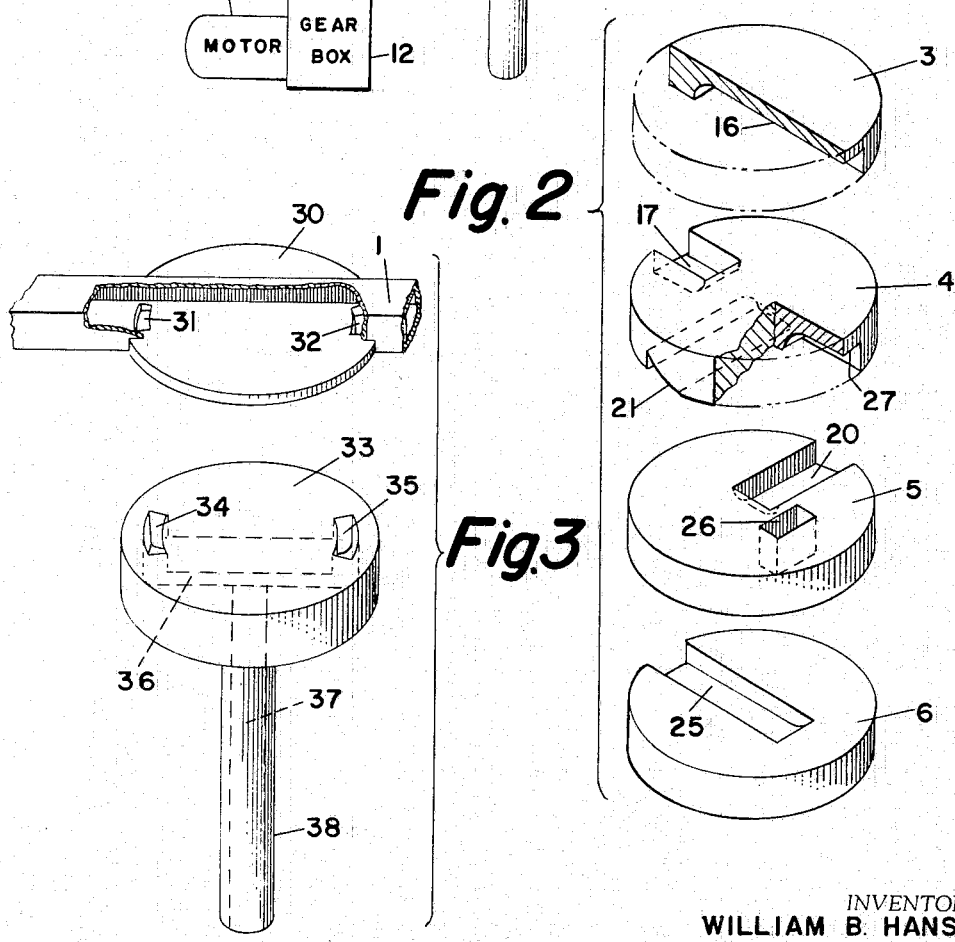
INVENTOR
WILLIAM B. HANSEL
BY George L. Church
ATTORNEY Dec. 12, 1967   W. B. HANSEL   3,357,797
WAVE ENGINE PORTING MEANS
Filed Oct. 20, 1964   2 Sheets-Sheet 2
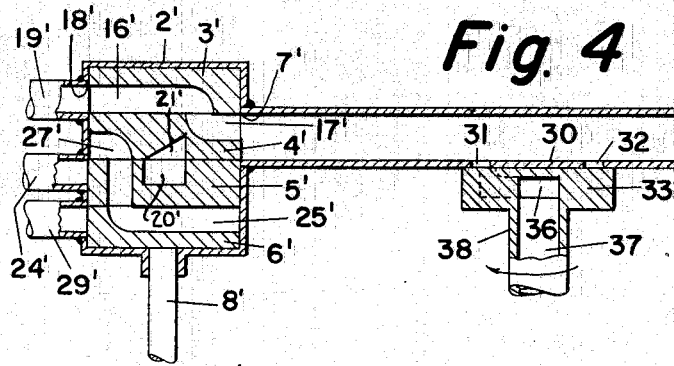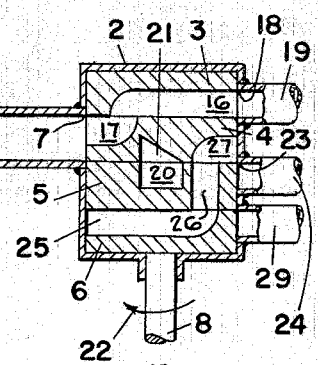
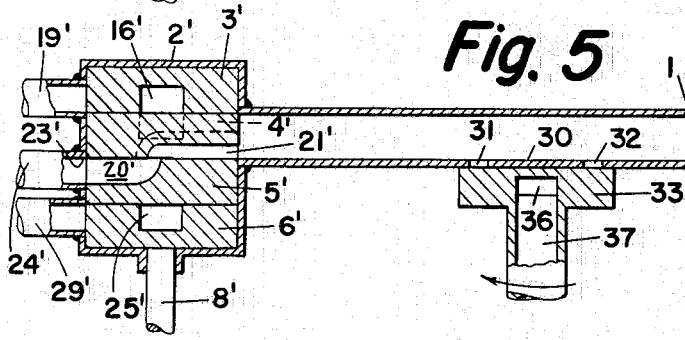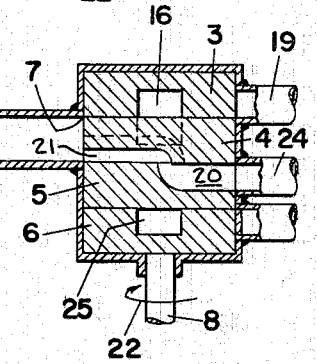
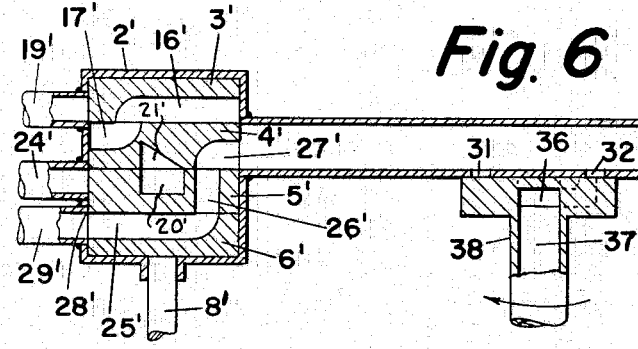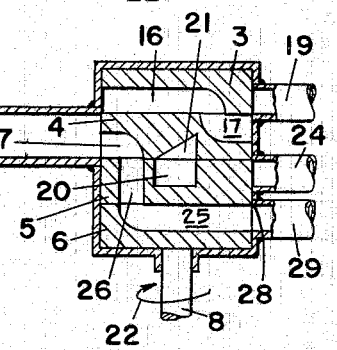
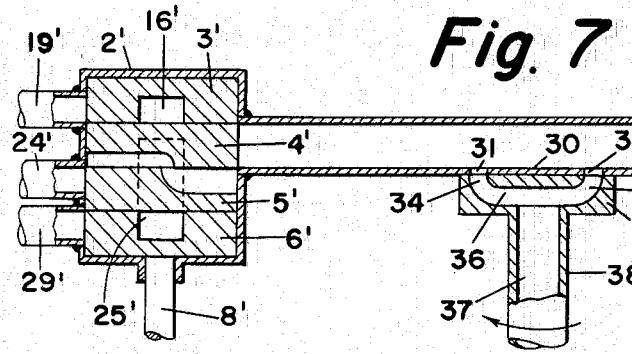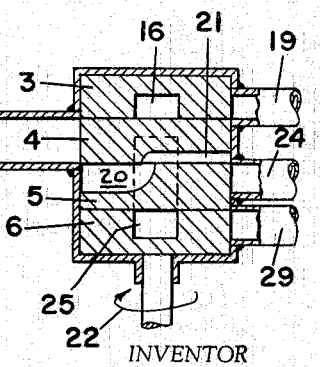
INVENTOR
WILLIAM B. HANSEL
BY George L. Church
ATTORNEY United States Patent Office 3,357,797
Patented Dec. 12, 1967

3,357,797
WAVE ENGINE PORTING MEANS
William B. Hansel, Media, Pa., assignor to Sun Oil Company, Philadelphia, Pa., a corporation of Pennsylvania
Filed Oct. 20, 1964, Ser. No. 405,161
6 Claims. (Cl. 23—284)

This invention relates to porting means for wave engines, and more particularly to rotating porting means for a stationary shock tube operating as a wave engine.

It has been found that certain endothermic chemical reactions may be carried out by subjecting a reactant material to one or more mechanical shock waves, thereby to produce a high temperature in such material for a very short period of time. The shock waves may be produced in a hollow conduit termed a shock tube, which may also, under operating conditions, be thought of as a wave engine.

The shock tube or wave engine may be used for many different chemical reactions. By way of example, hydrogen cyanide and acetylene may be prepared, using carbonaceous, hydrogenous, and nitrogenous material (such as a mixture of methane and nitrogen) as the reactant material. More specifically, it is possible to convert a mixture of natural gas (methane) and nitrogen into hydrogen cyanide and acetylene, by heating the reactant material quickly to temperatures above 3500° F., the heating to be almost immediately followed by cooling to a temperature not substantially greater than 1600° F., the cooling rate being comparable to the heating rate.

The required heating and cooling may be conveniently affected in a shock tube. A shock tube is a pipe or hollow conduit in which a gas or a gas mixture (termed the reactant material) can be heated very rapidly to very high temperatures by another gas, the driving gas, adiabatic compression being the heating mechanism. That is to say, the process involves adiabatic compression of the reactant material by another gas, the driving gas, which latter works in a way similar to a mechanical piston. The heating is followed almost immediately by rapid cooling through expansion. If there is a sequence of equivalent independent shock tube processes, the result is essentially a continuous flow process. When the shock tube operates in such a continuous flow process, it may be thought of as a wave engine.

From the foregoing, it may be realized that the process involves at least the following steps: charging of reactant material into the shock tube, charging of driving gas (e.g., hydrogen) into the shock tube, removal of driving gas from the shock tube, and removal of reaction products from the shock tube. In some cases, purging or flushing of the shock tube might also be involved. The steps described call for some form of valving means, to valve the various materials to and from the shock tube in the proper sequence, and at the proper times.

A previous form of valving means or porting means has involved the use of a shock tube rotating within a stationary port ring having a plurality of independent, separate ports to which fixed pipes or tubes are connected. The use of a rotating shock tube (which must, for proper operation of the process, rotate at a very high rate of speed) makes it extremely difficult, if not impossible, to measure process variables such as temperatures and/or pressures along the length of the tube, in order to determine whether the reaction is proceeding satisfactorily.

An object of this invention is to provide a novel porting or valving means for wave engines.

Another object is to provide a valving means for a wave engine utilizing a shock tube, by means of which the measurement of process variables along the length of the tube is greatly facilitated.

A further object is to provide an improved wave engine construction.

A still further object is to provide an improved wave engine arrangement utilizing a stationary shock tube, with rotating valves.

The objects of this invention are accomplished, briefly, in the following manner: A stationary open-ended hollow conduit serves as a shock tube. At each end of the conduit, there is located a rotating port assembly; each such assembly provides a plurality of separate fluid flow channels which are sequentially (as the assembly rotates) brought into communication with the adjacent, respective end of the conduit. At the center of the tube, there is located a rotating disc which provides a fluid flow channel arranged to communicate selectively (as the disc rotates) with the conduit, near the center thereof. The two port assemblies and the disc are rotatably driven, each at a substantially constant speed (though not necessarily at the same speed), from a common driving source. The rotating disc and the rotating port assemblies, coupled to fixed tubes or pipes, provide valving means which valve the various materials to and from the shock tube, as the various rotating channels come into communication with the tube.

A detailed description of the invention follows, taken in conjunction with the accompanying drawings, wherein:

FIG. 1 is a somewhat schematic illustration of a complete wave engine according to the invention, including the driving means for the rotating ports or valves;

FIG. 2 is an exploded view, partly in section, of one of the two end rotating porting assemblies;

FIG. 3 is an exploded view, partly cut away, of the center rotating porting means; and FIGS. 4–7 are sectional views of the shock tube and the various rotating porting means, showing the latter respectively in four different angular positions.

Referring now to the drawings, an open-ended elongated hollow conduit 1, for example a tube of square cross-section, is fixedly supported by suitable supporting means (not shown) to serve as a stationary shock tube. Generally, the conduit 1, which will hereinafter be termed a shock tube, is mounted so that its length dimension extends substantially horizontally.

One end of the tube 1, instead of being cut off "square," is machined on a radius which closely matches the contour of the outer surface of a cylindrical housing 2 within which rotates an assembly or stack of four superposed cylindrical discs 3, 4, 5, and 6. The inside vertical dimension of tube 1 is substantially the same as the height or vertical dimension of disc 4, which is one of the two interior discs of the stack. The diameters of all the disc 3–6 are the same and considerably greater than any cross-sectional dimension of conduit 1. The housing 2 has therein an aperture 7 whose dimensions correspond exactly to the interior dimensions of tube 1, and the said one end of tube 1 is sealed into this aperture, so that tube 1 communicates at this end with the interior of housing 2. Aperture 7 is commensurate in height with the height of disc 4, and is located in vertical alignment with this same disc.

The other end of tube 1 is machined on a radius closely matching the contour of the outer surface of a cylindrical housing 2' within which rotates an assembly or stack of four superposed cylindrical discs 3', 4', 5', and 6'. Elements 2', 3', 4', 5', and 6' are similar to the respective elements 2, 3, 4, 5, and 6 previously described, and in fact the former are "mirror images" of the latter. Therefore, the elements at the other (or left-hand) end of the tube will not be described in detail. Housing 2' has therein an aperture 7' exactly similar to aperture 7, previously described, and the tube 1 communicates at its opposite (left-hand) end with the interior of housing 2' by way of aperture 7'.

The stack 3–6 of discs, and also the stack 3'–6' of discs, are held together or in assembled relation in any suitable manner, such as by means of bolts (not shown). Each stack forms a rotating port assembly. Stack 3–6 is mounted for rotation as a unit inside housing 2, and is secured to the upper end of a shaft 8 which is rotatably driven by means of a pulley 9 secured to this shaft, and a drive belt 10 (which engages pulley 9) from the output shaft 11 of a gear box 12 whose input is driven by a motor 13, for example an electric motor. The arrangement is such that stack 3–6 is driven (rotated) at a substantially constant (and predetermined) speed, through a pulley 14 which is secured to shaft 11, and which is engaged by belt 10. Stack 3'–6' is mounted for rotation as a unit inside housing 2', and is secured to the upper end of a shaft 8' which is rotatably driven by means of a pulley 9' secured to this shaft. A drive belt 10' couples pulley 9' to a double-sheaved pulley 15 secured to shaft 11. Stack 3'–6' is arranged to be driven (rotated) at the same speed as stack 3–6.

The stationary housing 2 is sealed completely around shaft 8 and around the discs 3–6, with the exception of aperture 7 and three pipe apertures to be later described, in such a way that the discs can rotate within this housing. Similarly, the stationary housing 2' is sealed completely around shaft 8' and around the discs 3'–6', with the exception of aperture 7' and three pipe apertures to be later described, in such a way that these latter discs can rotate within housing 2'.

The discs 3–6, and likewise the discs 3'–6', have therein apertures or grooves which cooperate with those in adjacent discs of the stack to provide separate fluid (e.g., gas) flow channels or ports which lead to and from the tube 1. Due to the rotation of the discs 3–6 and 3'–6', these separate fluid flow channels are brought into communication with tube 1 separately and sequentially; thus, two rotating port assemblies (or valving assemblies) are provided, one at each end of the tube. Since the apertures or grooves in discs 3', 4', 5', and 6' are merely "mirror images" of the apertures or grooves in the corresponding discs 3, 4, 5, and 6, respectively, only the latter discs will be described in detail, to avoid unnecessary duplication.

Refer now to FIG. 2, which is an exploded view, with certain portions cut away, of the discs 3–6 themselves, without the housing 2. The uppermost disc 3 has a square-cornered U-shaped groove 16 cut into its lower face. One end of groove 16 opens into the outer cylindrical wall of disc 3, and this groove extends more or less diametrically across disc 3 to terminate at a point between the center of the disc and the opposite side of the cylindrical wall of the disc; in other words, the opposite or closed end of groove 16 is located at a point spaced radially inwardly from the opposite side of the cylindrical wall of the disc. Disc 4 has a short diametrically-extending square-cornered U-shaped groove 17 cut into its upper face, the outer end of this groove opening into the outer cylindrical wall of disc 4. Groove 17 is so located, angularly of disc 4, that when discs 3 and 4 are assembled together, the inner (closed) end of this groove will be aligned with, and come into communication with, groove 16 near the inner or closed end of this latter groove. Thus, when discs 3 and 4 are assembled together, grooves 16 and 17 combine to form a continuous fluid flow channel which extends from the outer cylindrical wall of disc 3 to the outer cylindrical wall of disc 4, in a diametral direction across the two discs. It may be seen that, when the discs 3 and 4 are in assembled relation, the bottom circular face of disc 3 provides an upper or top wall for the groove 17 part of the aforementioned channel, and the upper circular face of disc 4 provides a lower or bottom wall for the groove 16 part of the aforementioned channel, except, of course, for the area of overlap (or area of communication) of the two grooves 16 and 17.

The outer or open end of groove 17 (i.e., the end of this groove which opens into the outer cylindrical wall of disc 4) is adapted to come into communication with tube 1 (by way of aperture 7) when disc 4 reaches a certain angular position during rotation of the disc stack 3–6, since (as previously stated) tube 1 is aligned vertically with disc 4. This particular angular position is illustrated in FIG. 4.

In the upper portion of housing 2, and at an angular location which is diametrically across this cylindrical housing from tube 1, there is provided a rectangular aperture 18 extending through the wall of housing 2 and having dimensions somewhat larger than the cross-sectional dimensions of groove 16. Aperture 18 is located so as to come into alignment with the open outer end of groove 16, and thus to come into communication with this groove, when disc 3 reaches a certain angular position, to wit, the angular position depicted in FIG. 4. One end of a pipe 19 is permanently sealed into or around the fixed aperture 18, this pipe extending away from housing 2 and its opposite end being coupled to a source of a driving gas such as hydrogen. Thus, when the disc assembly 3–6 reaches the angular position illustrated in FIG. 4, there is a continuous fluid flow channel between the driving gas source and tube 1 via pipe 19, aperture 18, groove 16, groove 17, and aperture 7. It may be seen that driving gas is being supplied to shock tube 1 when the disc assembly 3–6 is in the angular position of FIG. 4. The particular angular position of the disc assembly 3–6 which is illustrated in FIG. 4 may be termed the 0° position.

At the left-hand end of tube 1, discs 3' and 4' are provided with similar grooves 16' and 17' which (when the disc assembly 3'–6' reaches the angular position illustrated in FIG. 4) form a similar continuous fluid flow channel between the driving gas source and the left-hand end of tube 1 via pipe 19', aperture 18', grooves 16', groove 17', and aperture 7'.

Disc 5 has a square-cornered U-shaped groove 20 cut into its upper face. One end of groove 20 opens into the outer cylindrical wall of disc 5, and this groove extends more or less diametrically across disc 5 to terminate at a point near the center of this disc. Disc 4 has a diametrically-extending groove 21 of triangular cross-section cut into its lower face, the outer end of this groove opening into the outer cylindrical wall of disc 4 at a point spaced approximately 90° counterclockwise around from groove 17. Groove 21 terminates near the center of disc 4, and is so located, angularly of disc 4, that when discs 4 and 5 are assembled together, the inner (closed) end of this groove will be aligned with, and come into communication with, groove 20 near the inner or closed end of this latter groove. Thus, when discs 4 and 5 are assembled together, grooves 20 and 21 combine to form a continuous fluid flow channel which extends from the outer cylindrical wall of disc 5 to the outer cylindrical wall of disc 4, in a diametral direction across the two discs. It may be seen that, when the discs 4 and 5 are in assembled relation, the upper circular face of disc 5 provides a lower or bottom wall for the groove 21 part of the aforementioned channel, and the bottom circular face of disc 4 provides an upper or top wall for the groove 20 part of the aforementioned channel, except, of course, for the area of overlap (or area of communication) of the two grooves 20 and 21.

The outer or open end of groove 21 (i.e., the end of this groove which opens into the outer cylindrical wall of disc 4) is adapted to come into communication with tube 1 (by way of aperture 7) when disc 4 reaches a certain angular position during rotation of the disc stack 3–6. This particular angular position is illustrated in FIG. 5, and may be termed the 90° position (if FIG. 4 illustrates the 0° position). If the disc stack is rotating in the direction indicated by arrow 22, the coming into communication of tube 1 and groove 21 follows, in time, the coming into communication of tube 1 and groove 17. Due to the triangular cross-sectional shape of groove 21, as this groove passes by the right-hand end of tube 1 the effective area of the last-mentioned or second fluid flow channel (which includes groove 21) will be different from that of the first-mentioned fluid flow channel (which includes groove 17).

In the lower portion of housing 2, and in vertical alignment with aperture 18, there is provided a rectangular aperture 23 extending through the wall of housing 2 and having dimensions commensurate with the cross-sectional dimensions of groove 20. Aperture 23 is located so as to come into alignment with the open outer end of groove 20, and thus to come into communication with this groove, when disc 5 reaches a certain angular position depicted in FIG. 5. One end of a pipe 24 is permanently sealed into or around the fixed aperture 23, this pipe extending away from housing 2 and serving as a driving gas withdrawal or driving gas expansion connection. Thus, when the disc assembly 3–6 reaches the angular position illustrated in FIG. 5, there is a continuous fluid flow channel between tube 1 and the driving gas expansion connection via aperture 7, groove 21, groove 20, aperture 23, and pipe 24. It may be seen that driving gas is being expanded or withdrawn from shock tube 1 when the disc assembly 3–6 in the angular position of FIG. 5.

At the left-hand end of tube 1, discs 5' and 4' are provided with similar grooves 20' and 21' which (when the disc assembly 3'–6' reaches the position illustrated in FIG. 5) form a similar continuous fluid flow channel between tube 1 and the driving gas expansion connection via aperture 7', groove 21', groove 20', aperture 23', and pipe 24'.

The lowermost disc 6 has a square-cornered U-shaped groove 25 cut into its upper face. One end of groove 25 opens into the outer cylindrical wall of disc 6, and this groove extends more or less diametrically across disc 6 to terminate at a point between the center of the disc and the opposite side of the cylindrical wall of the disc; in other words, the opposite or closed end of groove 25 is located at a point spaced radially inwardly from the opposite side of the cylindrical wall of the disc. Disc 5 has an opening 26 of rectangular cross-section cut therethrough, this opening extending in a vertical direction from one circular face to the other of disc 5 and the bottom or lower end of the opening 25 communicating with groove 25, near the closed end of the latter, when discs 5 and 6 are assembled together. Disc 4 has a short diametrically-extending square-cornered U-shaped groove 27 cut into its lower face, the outer end of this groove opening into the outer cylindrical wall of disc 4 at a point spaced approximately 90° counterclockwise around from groove 21. Groove 27 is so located, angularly of disc 4, that when discs 4 and 5 are assembled together, the top or upper end of opening 26 will come into communication with groove 27 near the inner or closed end of such groove. Thus, when discs 4, 5, and 6 are assembled together, groove 25, opening 26, and groove 27 combine to form a continuous fluid flow channel which extends from the outer cylindrical wall of disc 6, through disc 5 to the outer cylindrical wall of disc 4. It may be seen that, when the discs 4, 5, and 6 are in assembled relation, the lower circular face of the disc 5 provides an upper or top wall for the groove 25 part of the aforementioned channel, and the upper circular face of disc 5 provides a lower or bottom wall for the groove 27 part of the aforementioned channel, except, of course, for the areas of these two grooves which directly communicate with opening 26.

The outer or open end of groove 27 (i.e., the end of this groove which opens into the outer cylindrical wall of disc 4) is adapted to come into communication with tube 1 (by way of aperture 7) when disc 4 reaches a certain angular position during rotation of the disc stack 3–6. This particular angular position is illustrated in FIG. 6, and may be termed the 180° position (if FIG. 4 illustrates the 0° position). For rotation in the direction 22, the coming into communication of tube 1 and groove 27 follows, in time, the coming into communication of tube 1 and groove 21.

In the lower portion of housing 2, and in vertical alignment with aperture 18, there is provided a rectangular aperture 28 extending through the wall of housing 2 and having dimensions commensurate with the cross-sectional dimensions of groove 25. Aperture 28 is located so as to come into alignment with the open outer end of groove 25, and thus to come into communication with this groove, when disc 6 reaches a certain angular position, to wit, the angular position depicted in FIG. 6. One end of a pipe 29 is permanently sealed into or around the fixed aperture 28, this pipe extending away from housing 2 and serving as a product withdrawal (product out) connection. Thus, when the disc assembly 3–6 reaches the angular position illustrated in FIG. 6, there is a continuous fluid flow channel between tube 1 and the product out connection via aperture 7, groove 27, opening 26, groove 25, aperture 28, and pipe 29. It may be seen that gaseous products are being withdrawn or removed from shock tube 1 when the disc assembly 3–6 is in the angular position of FIG. 6.

At the left-hand end of tube 1, discs 6', 5', and 4' are provided with a similar groove 25', opening 26', and groove 27', respectively, which (when the disc assembly 3'–6' reaches the angular position illustrated in FIG. 6) form a similar continuous fluid flow channel between tube 1 and the product out connection via aperture 7', groove 27', opening 26', groove 25', aperture 28', and pipe 29'.

A rotatable means, which provides a fluid flow channel arranged to communicate selectively with tube 1, is located near the center thereof. This means, which provides a channel for supplying charge gas or reactant material to regions at opposite sides of the center of tube 1, but near the center thereof, will now be described.

A stationary disc member 30, having a diameter larger than any cross-sectional dimension of tube 1, is positioned at the center of tube 1, with the center of the disc located at the midpoint of the length of tube 1. Disc 30 is sealed into an opening provided in the bottom wall of tube 1, or is made integral therewith, so that a portion of the upper circular face of this disc provides the inner bottom wall of tube 1, at the center of the length thereof; in other words, the upper circular face of disc 30 is coplanar with the inner bottom wall of tube 1. Disc 30 has therein a pair of diametrically-opposite holes 31 and 32 which extend entirely through the thickness of this disc and thus provides passages or ports which communicate with the interior of tube 1. These holes 31 and 32 are located symmetrically on opposite sides of the center of the length of tube 1, but near such center, and the dimensions of the holes are such as to provide ample flows therethrough.

A disc member 33, having a diameter equal to that of disc 30, is mounted for rotation immediately subjacent to disc 30. Disc 33 has in its upper circular face a pair of diametrically-opposite ports 34 and 35 which are adapted to come into registry with holes 31 and 32 as disc 33 rotates. Disc 33 is mounted for rotation about a vertical axis which coincides with the center of disc 30. As disc 33 rotates, ports 34 and 35 come into and out of registry with holes 31 and 32. For example, in the angular position of disc 33 illustrated in FIG. 3, port 34 is in registry with hole 31, and port 35 is in registry with hole 32. This is also the case in FIG. 7. In an angular position of disc 33 which is 180° from that illustrated in FIG. 3, port 34 would be in registry with hole 32, and port 35 in registry with hole 31. It will be understood that, whenever the ports in disc 33 are in registry with the holes in disc 30, such ports are in communication with the interior of tube 1.

When disc 33, during its rotation, reaches an angular position wherein the ports in disc 33 are not in registry with the holes in disc 30, the holes 31 and 32 are in effect sealed off by the immediately subjacent imperforate area of the upper face of disc 33, and the ports 34 and 35 are in effect closed by the immediately overlying imperforate area of the lower face of disc 30. Thus, a rotatable valving or porting means is provided for the center of tube 1, and a fluid flow channel (to be described) including ports 34 and 35 is caused to communicate selectively with conduit 1.

As previously described, the ports 34 and 35 open at their upper ends into the upper circular face of disc 33. Ports 34 and 35 extend downwardly into disc 33 and are connected together, internally of disc 33, by a horizontally-extending passage 36 into which opens the upper end of the bore 37 in a centrally-located hollow rotatable shaft 38 which is secured to or integral with disc 33. Thus, the bore 37, with passage 36 and ports 34 and 35, forms a fluid flow channel which is caused to communicate selectively (by way of holes 31 and 32) with conduit or tube 1, as shaft 38 and disc 33 rotate.

A fixed or stationary pipe (not shown) is arranged to continuously communicate, at one end thereof, with the lower end of bore 37. The opposite end of the aforesaid fixed pipe is coupled to a source of charge gas (reactant material), for example a mixture of methane and nitrogen.

The bores 34 and 35 come into alignment with holes 31 and 32, respectively, when disc 33 reaches a certain angular position, to wit, the angular position depicted in FIG. 7. Thus, when disc 33 reaches the angular position illustrated in FIG. 7, there is a continuous fluid flow channel between the source of charge gas and tube 1 via the aforementioned unillustrated fixed pipe, bore 37, passage 36, ports 34 and 35, and holes 31 and 32. It may be seen that charge gas is being supplied to shock tube 1, and specifically to the center thereof, when the disc 33 is in the angular position of FIG. 7. The particular angular position of the disc 33 which is illustrated in FIG. 7 may be termed the 135° position of disc 33 (although it is, of course, the 270° position for the disc assemblies 3–6 and 3′–6′), since, as will be described, the disc 33 rotates at one-half the speed of the stacks 3–6 and 3′–6′. In the angular position of FIG. 7, the ends of tube 1 are closed off, since the solid wall portions of discs 4 and 4′ are then aligned with the apertures 7 and 7′, respectively. In FIG. 7, however (as previously described), the fluid flow channel is open to the center of tube 1.

Refer now to FIG. 1. Shaft 38 (and disc 33) are rotated at a fixed, predetermined speed (which is half that of disc assemblies 3–6 and 3′–6′) by means of a drive belt 39 which engages the previously-described pulley 15 and which also engages a large-diameter pulley 40 secured to shaft 38. Pulley 40 has a diameter which is just twice that of pulleys 9 and 9′, resulting in a speed of rotation for shaft 38 which is just one-half that of shafts 8 and 8′.

The mode of operation of the wave engine of this invention will now be summarized, with reference to FIGS. 4–7. A complete "cycle" of operation of the wave engine calls for 180° of rotation of disc 33, and 360° of rotation of disc stacks or assemblies 3–6 and 3′–6′.

Assume that shock tube 1 is initially filled with charge gas (for example, from a previous cycle of operation). In the angular position of FIG. 4 (which may be thought of as the 0° position for assemblies 3–6 and 3′–6′, and also as the 0 position for disc 33), driving gas is being admitted to both ends of tube 1, by way of pipe 19 and grooves 16 and 17 at one end, and pipe 19′ and grooves 16′ and 17′ at the other end. The admission of driving gas in this manner results in the production of shock waves in the tube 1, moving from both ends of the tube toward the middle thereof. This produces a high temperature in the charge gas (or reactant material) for a very short period of time. In the FIG. 4 position, the central holes 31 and 32 of tube 1 are closed by disc 33.

The angular position of FIG. 5 follows in time that of FIG. 4, and may be thought of as the 90° position for assemblies 3–6 and 3′–6′, and as the 45° position for disc 33. In this FIG. 5 position, driving gas is being withdrawn or expanded out of both ends of the tube, by way of grooves 21 and 20 and pipe 24 at one end, and grooves 21′ and 20′ and pipe 24′ at the other end. In the FIG. 5 position, central holes 31 and 32 of tube 1 are still closed by disc 33.

The angular position of FIG. 6 follows in time that of FIG. 5, and may be thought of as the 180° position for assemblies 3–6 and 3′–6′, and as the 90° position for disc 33. In this FIG. 6 position, reaction products are being withdrawn or removed from both ends of the tube, by way of groove 27, opening 26, groove 25, and pipe 29 at one end, and groove 27′, opening 26′, groove 25′, and pipe 29′ at the other end. In the FIG. 6 position, central holes 31 and 32 of tube 1 are still closed by disc 33.

The angular position of FIG. 7 follows in time that of FIG. 6, and may be thought of as the 270° position for assemblies 3–6 and 3′–6′, and as the 135° position for disc 33. In this FIG. 7 position, the ends of the tube are closed off by the solid wall portion of discs 4 and 4′. In the FIG. 7 position, charge gas is being supplied to the center (i.e., the central region) of tube 1, for the next cycle of operation of the engine, by way of bore 37, passage 36, ports 34 and 35, and holes 31 and 32.

A complete cycle of operation has now been described, and the tube becomes filled with charge gas, ready for the next application of driving gas (as in FIG. 4). It should be realized that, for the next admission of charge gas (which would take place at the 315° position for disc 33), port 34 would be in registry with hole 32, and port 35 in registry with hole 31; otherwise, the showing would be the same as in FIG. 7.

The previous description has called for the admission of charge gas at the center of the tube, and for the removal of products at the ends of the tube. It is pointed out that, by changing the location of items 25, 26, and 27 in discs 6, 5, and 4, respectively, and by changing the phase of disc 33 relative to the disc assemblies 3–6 and 3′–6′, products may be removed from the center of the shock tube, and charge gas may be admitted to the ends of the tube. This last-mentioned mode of operation may be preferable, in some cases.

The invention claimed is:

1. In a wave engine, an open-ended stationary elongated hollow conduit, a plurality of fixed pipes at one end of said conduit, a rotatable valving arrangement for bringing individual ones of said pipes selectively into fluid communication with said one end of said conduit, a plurality of fixed pipes at the other end of said conduit, a rotatable valving arrangement for bringing individual ones of said last-mentioned pipes selectively into fluid communication with said other end of said conduit, means providing a fluid flow channel near the center of said conduit, and a rotatable valving arrangement for bringing said channel into and out of fluid communication with the central portion of said conduit.

2. Combination defined in claim 1, including also a common driving source for rotating all of said rotatable valving arrangements.

3. In a wave engine, an open-ended stationary elongated hollow conduit, rotatable means providing a plurality of separate fluid flow channels arranged to communicate selectively and individually with one end of said conduit, rotatable means providing a plurality of separate fluid flow channels arranged to communicate selectively and individually with the other end of said conduit, and rotatable means providing a fluid flow channel arranged to communicate selectively with said conduit near the center thereof.

4. Combination defined in claim 3, including also a common driving source for rotating all of said rotatable means.

5. In a wave engine, an open-ended stationary elongated hollow conduit, a plurality of discs assembled in superposed relation, said discs having cut-away portions defining a plurality of separate fluid flow channels arranged to communicate selectively and individually with one end of said conduit; means for rotating said disc assembly, a plurality of discs assembled in superposed relation, said last-mentioned discs having cut-away portions defining a plurality of separate fluid flow channels arranged to communicate selectively and individually with the other end of said conduit; means for rotating said last-mentioned disc assembly, a disc having cut-away portions defining a fluid flow channel arranged to communicate selectively with said conduit near the center thereof; and means for rotating said last-mentioned disc.

6. Combination defined in claim 5, including also a common driving source for driving all of said rotating means.

References Cited

UNITED STATES PATENTS 2,524,234  10/1950  Scheuk _____ 137—625.21
2,675,830  4/1954  Vuillemin _____ 137—625.21

JOSEPH SCOVRONEK, *Acting Primary Examiner.*

JAMES H. TAYMAN, Jr., *Examiner.*